US00RE46804E

(19) United States
(12) Reissued Patent
Zhang

(10) Patent Number: US RE46,804 E
(45) Date of Reissued Patent: Apr. 24, 2018

(54) REGENERATIVE AIR PURIFICATION SYSTEM AND METHOD

(71) Applicant: Wei Zhang, Bellevue, WA (US)

(72) Inventor: Wei Zhang, Bellevue, WA (US)

(73) Assignee: Wei Zhang, Bellevue, WA (US)

(21) Appl. No.: 15/810,075

(22) Filed: Nov. 12, 2017

Related U.S. Patent Documents

Reissue of:
(64) Patent No.: 9,597,627
Issued: Mar. 21, 2017
Appl. No.: 14/517,899
Filed: Oct. 19, 2014

U.S. Applications:
(60) Provisional application No. 61/924,416, filed on Jan. 7, 2014.

(51) Int. Cl.
*B01D 53/02* (2006.01)
*B01D 53/04* (2006.01)
*B01D 53/75* (2006.01)
*B01D 53/00* (2006.01)

(52) U.S. Cl.
CPC ..... *B01D 53/0454* (2013.01); *B01D 53/0407* (2013.01); *B01D 53/75* (2013.01); *B01D 53/007* (2013.01); *B01D 2253/102* (2013.01); *B01D 2257/708* (2013.01); *B01D 2259/4508* (2013.01); *B01D 2259/804* (2013.01)

(58) Field of Classification Search
CPC ..... B01D 2253/102; B01D 2257/708; B01D 2259/4508; B01D 2259/804; B01D 53/007; B01D 53/0407; B01D 53/0454; B01D 53/75
See application file for complete search history.

(56) References Cited

U.S. PATENT DOCUMENTS 5,538,697 A * 7/1996 Abe ..... B01D 53/945 422/169
6,460,328 B1 * 10/2002 Hertzberg ..... B01D 53/9431 60/274
6,660,068 B1 * 12/2003 Garner ..... B01D 46/0032 55/282.3
2002/0134234 A1 * 9/2002 Kalbassi ..... B01D 53/0462 95/11
2003/0089647 A1 * 5/2003 Tsuihiji ..... B01D 29/15 210/87

(Continued)

*Primary Examiner* — Christopher P Jones
(74) *Attorney, Agent, or Firm* — Guosheng Wang; United States Research and Patent Firm

(57) ABSTRACT

The invention provides a system for regenerative air purification and a method thereof. The system includes a set of gas sensors, a processor, an adsorption gas filters with $TiO_2$ (or $TiO_2$ mixed activated carbon material) coated on the outer surface, a set of auto valves, a set of UV lamps, and a heater near the adsorption filter. The processor is configured to receive input data from the gas sensors and to control the system. During an air cleaning phase, the air is ventilated through the adsorption filter and VOCs are trapped therein. During a regenerative phase, the UV lamps and heater are turned on and the adsorption filter media will be cleaned up via the combined approaches including the heating of the heater, photo-catalytic oxidation and a reversed air flow.

8 Claims, 10 Drawing Sheets

(56) References Cited

U.S. PATENT DOCUMENTS

| | | | | |
|---|---|---|---|---|
| 2004/0076568 | A1* | 4/2004 | Yan | B01D 53/02 423/240 S |
| 2006/0032213 | A1* | 2/2006 | Woll | F01N 3/0871 60/274 |
| 2006/0053772 | A1* | 3/2006 | Dou | F01N 3/0814 60/285 |
| 2006/0249384 | A1* | 11/2006 | Kim | G01N 27/127 204/424 |
| 2008/0163610 | A1* | 7/2008 | Baird | F01N 3/0842 60/295 |
| 2008/0210085 | A1* | 9/2008 | Morf | B01D 53/12 95/13 |
| 2009/0260518 | A1* | 10/2009 | Wright | B01D 53/0462 95/11 |
| 2009/0314164 | A1* | 12/2009 | Yamashita | F24F 3/1603 96/245 |
| 2010/0284903 | A1* | 11/2010 | Harutyunyan | B01D 53/32 423/648.1 |
| 2011/0247396 | A1* | 10/2011 | Zhang | G01N 33/0029 73/31.05 |
| 2012/0301360 | A1* | 11/2012 | Meinhold | B01J 20/28047 422/68.1 |

* cited by examiner

REGENERATIVE AIR PURIFICATION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present invention relates generally to air purification technology and more particularly to systems and methods for regenerative air purification technology in commercial, residential, and industrial buildings.

BACKGROUND

People on average spend about 90% of their time indoors. The quality of air in office, residential, school, and industrial buildings can significantly affect the health and productivity of building occupants. Sick buildings, toxic molds, epidemics of asthma allergies, have made indoor air quality critical, in which Volatile organic compounds (VOCs) are among the most abundant chemical pollutants in the indoor air according to WHO [1] and USEPA [2]. The problems include eye; nose; and throat irritation, headache, recurrent fatigue, drowsiness, dizziness, and reduced power of concentration [3].

Therefore, for commercial residential and industrial buildings, providing a good ventilation system with air-purification device is a key to provide better indoor air quality (IAQ) and to save energy. Many advanced technologies related to air purification devices for removal of pollutants from indoor air have recently been developed. These air purification devices includes removal of particulate and gaseous that may be installed in the ductwork of building central heating, ventilating, and air-conditioning (HVAC) system to clean the air, or a kind of portable room air cleaners that can be used to clean the air in a single room or in specific areas.

There are two types of air-cleaning approaches commonly being used, one are mechanical air filters, such as high efficiency particulate air (HEPA) filters that remove particles by capturing them on filter materials, or electronic air cleaners such as electrostatic precipitators that use a process called electrostatic attraction to trap particles. Another type of air-cleaning device is air purification such as gas-phase adsorption filter designed to remove gases and odors by either physical or chemical processes. Specifically, the technology of gaseous removal air purifications include an activated carbon adsorption filter (ACA), photo-catalytic oxidation (PCO) devices, ultraviolet photocatalytic oxidization (UV-PCO), plasma ionization approach (PIA), ozone ionization approach (OIA), soil filtration technology (SFT), etc. The effectiveness of applying these techniques varies widely, some air cleaners are largely ineffective, and some produce harmful by-products.

A state-of-the-art review of all kinds of air purification technologies has been taken through over 160 scientific literatures [4]. The conclusions indicated that (1) none of the current technologies was able to effectively remove all indoor pollutants and many were found to generate undesirable by-products during operation, (2) Particle filtration and sorption of gaseous pollutants were among the most effective air cleaning technologies, but there is insufficient information regarding long-term performance and proper maintenance.

Accordingly a need exists in the art for improved techniques for air purification technologies and evaluation.

SUMMARY

The present invention address the problems by providing regenerative air purification technology, which is based on the combination of different air purification technologies for use in residential or commercial HVAC systems. During the air cleaning phase, the air is ventilated through the pre-particle filter, "HEPA" filter or a high efficiency filter with nano-material fibers (HENF) and combined activated carbon adsorption filter with photo-catalytic oxidation (PCO) devices via a well designed manifold tube, in which the particles (dust, pollen, some mold spores, etc.) will be captured on the pre-particle filter and "HEPA" or "HENF" filter materials and VOCs (formaldehyde, acetaldehyde, and ketones, etc.) are trapped by the adsorption filter (such as activated carbon). During the regenerative phase, the situated adsorption filter media will be cleaned up via a combined approach including a heater, PCO technology and a reversed air flow as system one in the present invention, or the situated adsorption filter media; will be cleaned up via a combined approach including a heater; a PCO technology; and a reversed air flow and the pre-particle filter and "HEPA" or "HENF" filter materials will be cleaned up via a reversed air flow as a system two in the present invention.

A set of nano-technology gas sensors were positioned within a compartment to identify the suitable gas concentration (such as TVOC); there are a number of the advanced gas sensor technologies available including (but not limited to) metal oxide sensor; photo ionization detector; electrochemical sensor; fiber-optical sensor and differential mobility spectrometry. The Nano-Technology with metal oxidation approach will be focused due to the selectivity; sensitivity; reliability; and practicability of the required by gas sensor in present invention. A signal from the gas sensors will be sent to control panel which then sends a signal to auto valves system, which is built for controlling the switch between the air cleaning phase and the regenerative phase.

BRIEF DESCRIPTION OF THE DRAWINGS

The following description, given by way of example and not intended to limit the present invention solely thereto, will best be understood in conjunction with the accompanying drawings in which.

DETAILED DESCRIPTION

In the present disclosure, like reference numbers refer to like elements throughout the drawings, which illustrate various exemplary embodiments of the present invention. There are two systems proposed in the present disclosure, the key difference between both systems is that System One (FIG. 1 and FIG. 2, FIG. 3) only regenerate the cylinder type of a gas adsorption filter, and System Two (FIG. 4. and FIG. 5, FIG. 6.) is to regenerate all filters including the pre-filter, the HEAP or HENF filter, and the gas adsorption filter.

Figure 1:
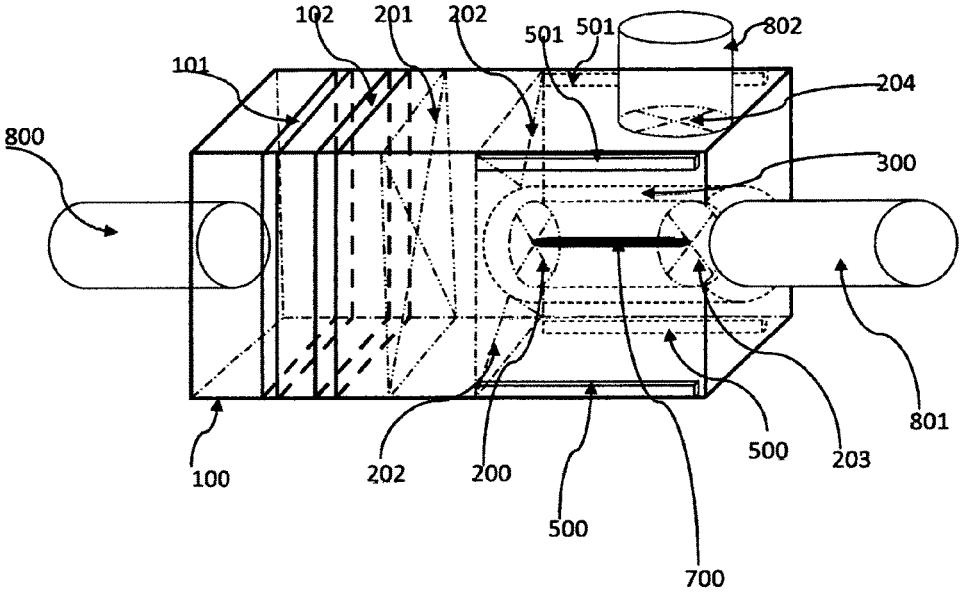
FIG. 1, a three dimensional concept of System One showing the air cleaning phase of RAPT (regenerative air purification technology) according to an embodiment of the present invention.
Figure 2:
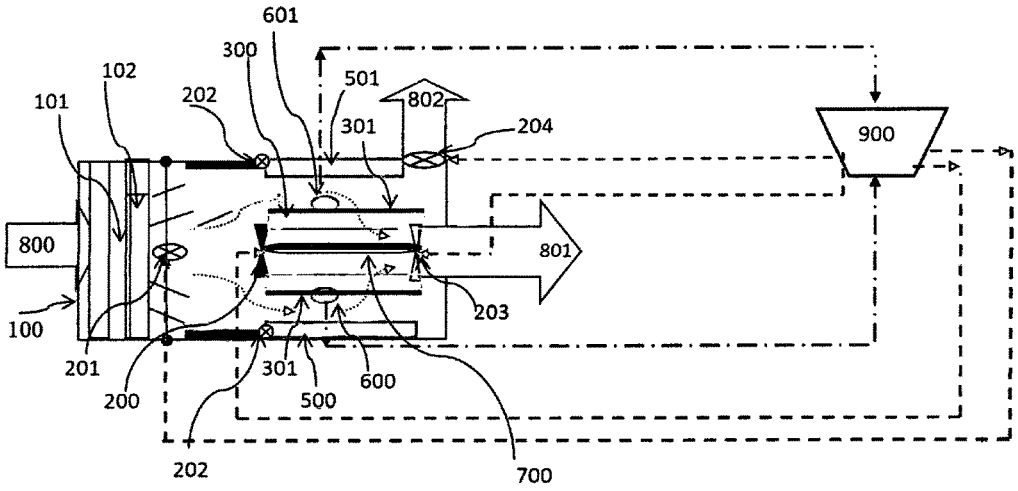
FIG. 2, a diagram of System One showing the air cleaning phase of RAPT (regenerative air purification technology) according to an embodiment of the present invention.

As shown in FIG. 1 and FIG. 2, the present invention of System One in the regenerative air purification package includes a rectangle device box (100), a pre-filter (101), a HEAP or HENF filter (102) and a gas adsorption filter (cylinder type, 300) will be installed in the device box. $TiO_2$ or $TiO_2$ mixed with activated carbon material (301) will be coated on the outer surface of the adsorption filter cylinder (300) as a reaction surface for PCO technology. The heater device (700) that is installed in the central location of the adsorption filter cylinder (300) is used as a part of the regenerative function. The air duct (801) in the central section is configured for delivering cleaned air and the side duct (802) is served for the regenerative function. In addition, several UV lamps (500 and 501) are installed in the boundary side of the device box (100), as part of PCO technology. There are five different auto valves (200, 201, 202, 203, 204) installed in the device box, which are used for controlling the change from the clean air phase to the regenerative phase. These auto valves will be controlled by control panel (900). Gas sensors 600 and 601 are located on the surface of $TiO_2$ (301) and is used for sending gas sensor signals to the control panel (900). The device (100) may be installed in HVAC systems or in portable air cleaners.

Figure 3:
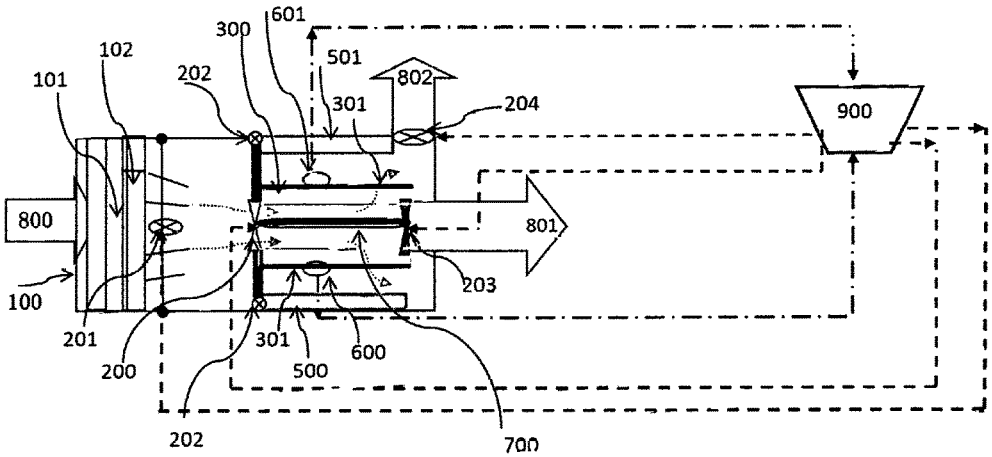
FIG. 3, is a diagram of System One showing the regenerative phase of RAPT (regenerative air purification technology) according to an embodiment of the present invention.

Referring now to the drawings and in particular to FIG. 1, FIG. 2 and FIG. 3 of System One, the regenerative air purification disclosed herein uses the combination of several approaches. During the air cleaning phase (FIG. 2), the air from duct 800 passes through the pre-filter (101) and HEPA or HENF filter (102) to remove particles then goes through the adsorption filter media 300 and 301 (from outside of cylinder penetrates 301 and into the inside of cylinder 300) to capture VOCs compounds.

The regenerative phase is that when detected concentrations of chemical compounds from gas sensors 600 and 601 are reached a threshold; the system will be changed from the cleaning air phase (FIG. 2) to the regenerative phase (FIG. 3) for regenerating the adsorption filter. Detailed description is given below.

As shown in FIG. 2 of System One, during the air cleaning process, auto valves 202 and 203 are opened and auto valves 200 and 204 are closed. UV lamps 500 and 501 on PCO technology are turned off. The air will flow around the adsorption filter (301 and 300) and penetrated into the adsorption media (300).

In the exemplary embodiment, a plurality of gas sensors 600 and 601 are mounted on the surface of $TiO_2$ (301) in the package 100, the gas sensors 600 and 601 are configured to detect chemical compounds (such as high sensitive TVOC) for controlling the timing of the regenerative phase. During air cleaning phase, when sensors (600,601) detected concentration of chemical compounds (such as TVOC) on the surface of material (301) is higher enough and reached the upper threshold, the signals from the gas sensors (600 and 601) will be sent to control panel 900. The process on the control panel will send a signal to (lie auto valves system, letting the system change from the cleaning air phase to the regenerative phase for regenerating the adsorption filter (300), in which auto valves 202 and 203 will be indicated to close and auto valve 200 and 204 will be indicated to open or partially open. The direction of valve 201 will be changed.

FIG. 3 of System One shows the system regenerative phase. During the system regenerative process, auto valve 202 and 203 are closed (or 203 is partially closed) and the auto valve 200 and 204 are opened (or 204 partially opened). UV lamps 500 and 501 on PCO technology are turned on; the heater (700) in the central location of the adsorption filter media (300) is turned on. In the exemplary embodiment, during the regenerative phase, the inside of the adsorption filter media (300) will be heated up through the heater 700 to make contaminant compounds to be easily desorbed from gas adsorption filter media (300). The reversed air flows into the center of the adsorption filter (300) and is penetrated from inside onto outside of the adsorption media (300 and 301), the air flow rate is controlled by auto valves 203, 204, and 202. The chemical compounds in heated adsorption media (300) will be activated and pushed out from the adsorption media (300 and 301) through reversed airflow.

During the regenerative phase, (FIG. 3) in order to enhance the desorption of the contaminant compounds on the adsorption filter (300), UV lamps 500 and 501 around system box will be turned on. An additional material (301) including $TiO_2$ or mixed activated carbon material with TiO2 will be coated on the outer surface of the adsorption filter cylinder (300) as a reaction surface for UV lamps 500 and 501 which will convert the desorbed contaminant compounds near the outer surface of the adsorption media (301) into $H_2O$ and $CO_2$. The reversed air flow rate of the regenerative phase will be controlled by auto valves (202; 203, and 204) and travel the converted contaminant compounds (includes $H_2O$ and $CO_2$) out of the air purification device through the duct 802.

The present invention of System Two in the regenerative air purification package is similar to System One, but the configuration of the rectangle device box (100) is different. As shown in FIG. 3, a pre-filter (101), a HEAP or HENF filter (102) and a cylinder type of a gas adsorption filter (300) will be installed in the device box (100). $TiO_2$ or $TiO_2$ mixed with activated carbon material (301) will be coated on the outer surface of the adsorption filter cylinder (300) as a reaction surface for PCO technology. The heater device (700) is installed in the central location of adsorption filter cylinder (300), is used as a part of the regenerative function. The air duct 801 in the central section is configured for delivering cleaned air and the side duct 802 is used for the regenerative function. In addition, several UV lamps 500 and 501 are in the boundary side of the device box as a part of PCO technology. There are five different auto valves (200, 201, 202, 203, 204) in the device box (100), for controlling the change from the air cleaning phase to the regenerative phase. These auto valves will be controlled by control panel (900). Gas sensors (600 and 601) are located on the surface of $TiO_2$ or $TiO_2$ mixed with activated carbon material (301) for sending gas sensor signals to control panel (900).

Figure 4:
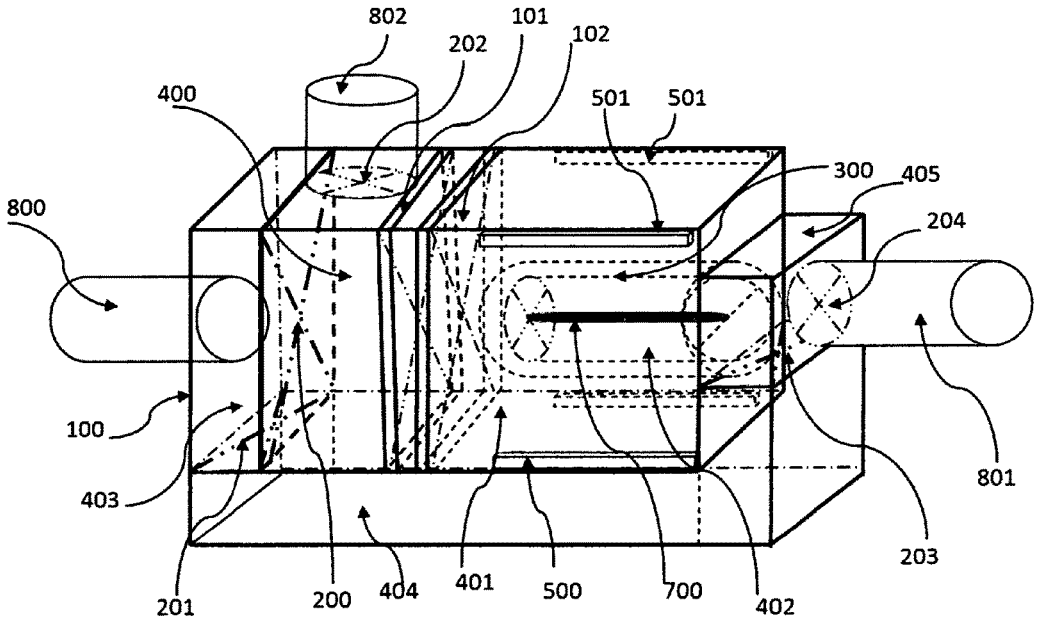
FIG. 4, a three dimensional concept of System Two showing the air cleaning phase of RAPT (regenerative air purification technology) according to an embodiment of the present invention.
Figure 5:
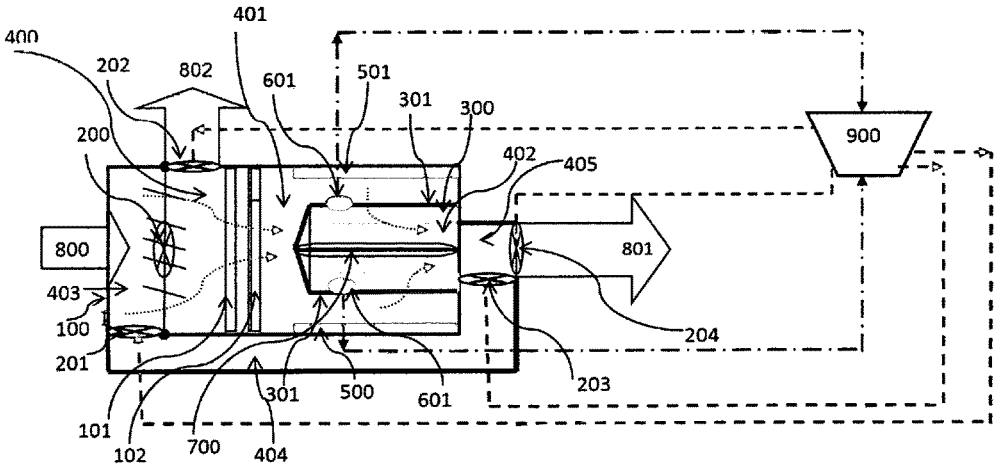
FIG. 5, a diagram of System Two showing the air cleaning phase of RAPT (regenerative air purification technology) according to an embodiment of the present invention.

Referring now to the drawings and in particular to FIG. 4 and FIG. 5 of System Two, during the air cleaning process, the box device (100) may be installed in HVAC systems or in portable air cleaners, auto valves 200 and 204 are opened and auto valves 201, 202 and 203 are closed. UV lamps 500 and 501 on PCO technology are turned off, the air enters the compartment 400, passes through the pre-filter (101) and HEPA or HENF filter (102), reaches compartment 401 to reduce the amount of particulate matter, then reaches the adsorption filter (300) to collect gas contaminants. The air flows around the adsorption filter (301 and 300) then penetrated into the adsorption media (300). The cleaned air in the compartment 402 will then be transported through the air duct 801. During the air cleaning phase, when gas sensors 600 and 601 detected concentration of chemical compounds reached a upper threshold, the system will be changed from the cleaning air phase (FIG. 5) to the regenerative phase (FIG. 6) for regenerating all of the filters including the pre-filter (101), the HEAP or HENF filter (107) and the adsorption filter (300 and 301).

In the exemplary embodiment, during the regenerative approach (FIG. 6), the heater (700) is turned on and the inside of the adsorption filter media (300) will be heated up via the heater (700) to make contaminant compounds be easily desorbed from gas adsorption filter media (300). UV lamps 500 and 501 on PCO technology are turned on and to convert the desorbed contaminant compounds near the outer surface of the media (301) into $H_2O$ and $CO_2$. Auto valves 200 and 204 will be indicated to close and auto valves 201, 202 and 203 will be indicated to open (or partially close with 204 based on the flow rate control) that makes reversed air flow pass through all filters possible. The reversed air flows from the duct 403 through the duct 404 and 405 into the central compartment 402 of the adsorption filter (300) and penetrated to outside of the adsorption media (300 and 301) and then reaches the compartment 401, pass through the compartment 400 goes out from the side air duct 802. The air flow rate is controlled by the auto valve 204. The chemical compounds in heated adsorption media (300) will be activated and pushed out from the adsorption media (301) through reversed airflow shown in FIG. 6.

Figure 6:
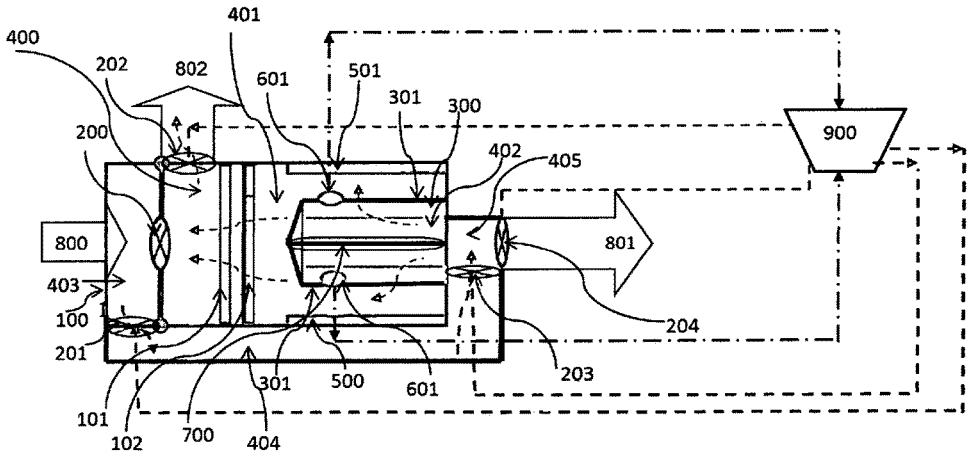
FIG. 6, is a diagram of System Two showing the regenerative phase of RAPT (regenerative air purification technology) according to an embodiment of the present invention.

During the regenerative phase on both systems, in order to enhance the desorption of the contaminant compounds on the adsorption filter (300), the UV light from UV lamps (500 and 501) around system box (100) will be controlled in order for maximizing the reaction and converting the desorbed contaminant compounds into $H_2O$ and $CO_2$ (FIG. 3 and FIG. 6). The reversed air flow in both systems will transport the converted contaminates compounds (includes $H_2O$ and $CO_2$) out of the air purification device through the air duct 802.

Figure 7:
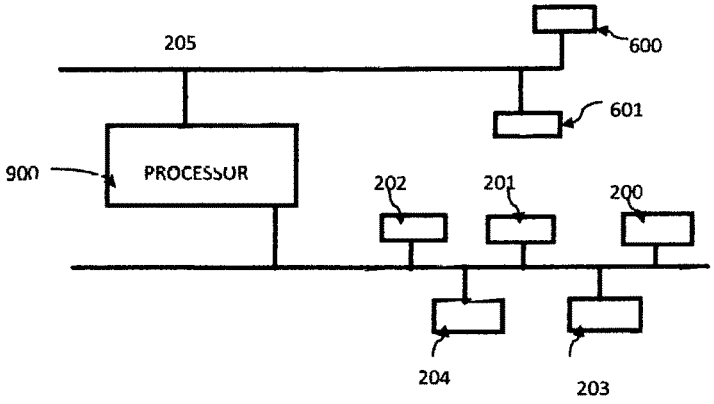
FIG. 7, is a block diagram of the regenerative air purification package on HVAC system according to an embodiment of the present invention.

As shown in FIG. 7, the gas sensors 600 and 601 and auto control valves 200, 201, 202, 203 and 204 are networked together on a network 205 such as that the central processor 900 receives gas input data from gas sensors 600 and 601 in real time. In the exemplary embodiment, the processor 900 is to combine the input data and to determine if the averaged contaminant concentration on the adsorption filter media (300 and 301) is over the upper threshold. When the processor 900 has determined that the averaged contaminant concentration is over the upper threshold, a signal is sent from control panel (900) to the auto valves system (200, 201, 202, 203 and 204) which used for controlling the change from the air cleaning phase to the regenerative phase or from the system regenerative phase back to the air cleaning phase (the maximum regenerative time will be controlled within one hour).

Processor 900 is programmed to process the signals received from gas sensor network comprising signals from sensors 600 and 601. Processor 900 is also configured as part of a control panel to send signals to auto valves (200, 201, 202, 203 and 204) which control the change between the air cleaning phase and the regenerative phase.

The gas sensor network and control system and method deploys a combination of a sensor packages and Nano-tech based metal oxide gas sensors 600 and 601 (FIG. 7) which are coupled to central processor 900 configured to implement a control method to determine when a detected averaged contaminants concentration reached an upper threshold or a lower threshold in the area around surface of adsorption filter media (300 and 301), which can be averaged from both nano-tech metal oxide sensors (such as TVOC sensors) 600 and 601.

More particularly to systems and methods for the regenerative air purification technology, during the air cleaning phase, a physical adsorption mechanism in the pores of the adsorption material (300) is used for collecting gas contaminants. Typical adsorption material for VOCs removal is a type of activated carbon. Because there are over hundred possible chemical compounds could be found from indoor environment, the efficiency of physical adsorption depends on different indoor contaminants which may be saturated after a short period of time and then the breakthrough will be taken place. Although the low vapor pressure chemicals are removed very effectively by physical adsorption in terms of the micro-porous structure of the adsorption material and relatively high vapor pressure chemicals may not be properly removed by physical adsorption, the major gaseous contaminants removal in indoor environment by adsorption mechanism is efficient, according to published research [4]. Additional factors also effect the efficiency of physical adsorption such as Molecule structure and weight (MW) (small MW reduces adsorption capability); Humidity (high humidity reduces adsorption capability); Residence time in gas adsorption filter (related to flow rate, large flow rate reduce residence time and reduces adsorption capability) as well as the size of gas adsorption filter bed (small size of filter bed reducing adsorption capability).

As indicated above, although the adsorption gas filters may effectively remove some specific pollutants from indoor air, none is expected to remove adequately all of the gaseous pollutants in typical indoor air. The major limitation is that the adsorption gaseous-removal system usually has a very limited lifetime due to the fact that the adsorption media become saturation, which must be replaced or regenerated in order to keep relatively higher efficiency. Typical adsorption gas filter could be braked-through within number of ten hours depends on different conditions. In addition, there is also a concern that saturated adsorption filters may release trapped pollutants back into the airstream. To overcome these limitations, the regenerative approaches are proposed in the present invention will use the heater in the central location of adsorption filter (300), the reversed air flow in the device box (100) and a PCO technology to convert the gaseous pollutants into H2O and CO2 for regenerating the adsorption filter.

The chemical reaction with impregnated reactive materials 301 (such as $TiO_2$ or $TiO_2$ mixed with activated carbon) for reacting with light from UV lamps in PCO approach is used as part of regenerative function on this invention. PCO technology is intended to destroy gaseous pollutants and their odors by converting them into harmless by products ($H_2O$ and $CO_2$). PCO technology uses a UV lamp as a Photo-Catalyst, usually titanium dioxide ($TiO_2$), to create oxidants that destroy gaseous contaminants. When the photo-catalyst is irradiated with UV light, a photo-chemical reaction will take place and hydroxyl radicals forms. The hydroxyl radicals oxidize gaseous pollutants adsorbed on the catalyst surface. This reaction, called photo-catalytic oxidation, converts organic pollutants into carbon dioxide and water.

In present invention, PCO technology is only used for regenerative phase, not for the air cleaning phase. This is because PCO is still an emerging technology intended to improve air quality by destroying gaseous contaminants; however the current available photo-catalysts technologies (i.e., substances that react with light) are ineffective in completely destroying gaseous pollutants in indoor air. As a result, there are normally by-products (such as formaldehyde etc.) are produced during the PCO operation.

Figure 8:
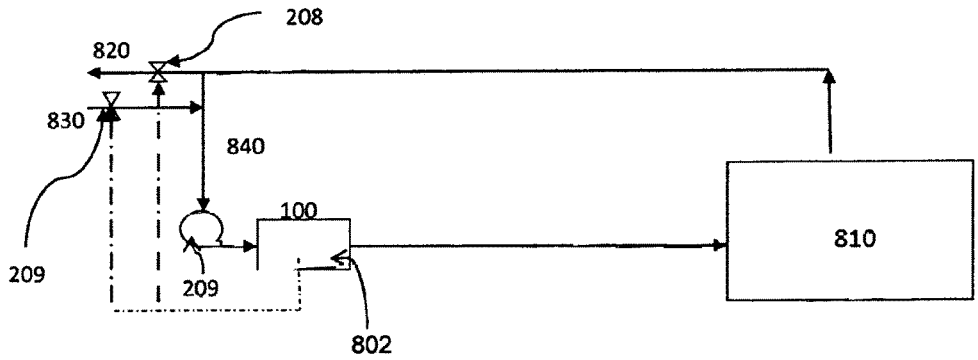
FIG. 8, is a diagram of sensors and control valves system used in an embodiment of the present invention.

FIG. 8, is a diagram of the regenerative air purification device (100) on a HVAC system. The air passes through the air purification device (100) into indoor (810) driven by system fan (230). The return air (840) and fresh air (830) are controlled by the valves 208 and 209. During the regenerative phase, the air flow rate passes through indoor (810) may be changed due to output air flow (820), the control valves 208 and 209 maintain the flow rate through the fan (230) for system flow rate stability.

Figure 9:
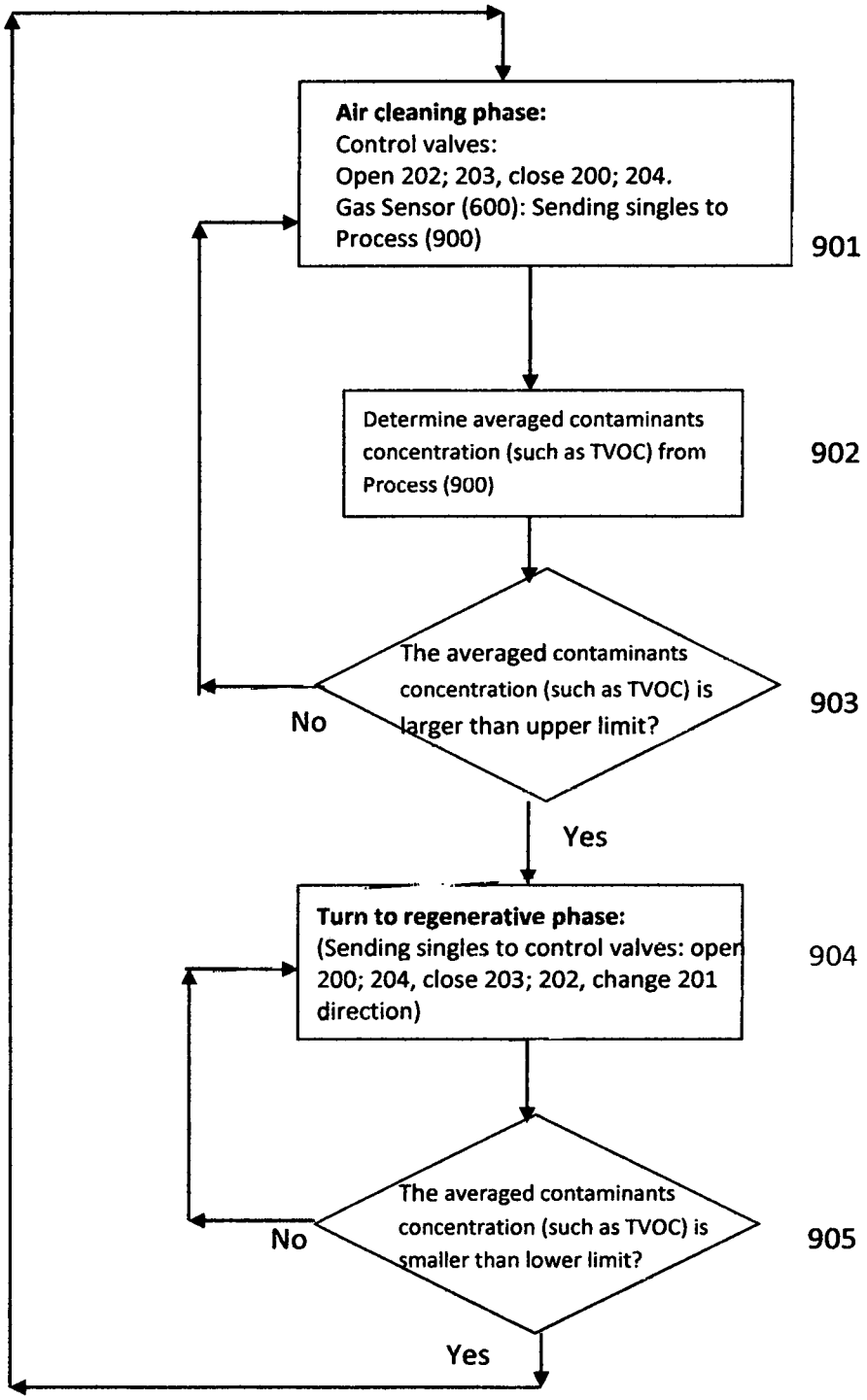
FIG. 9, is a flowchart showing the operation of an embodiment of then present invention of System One in the air cleaning phase and the regenerative phase.
Figure 10:
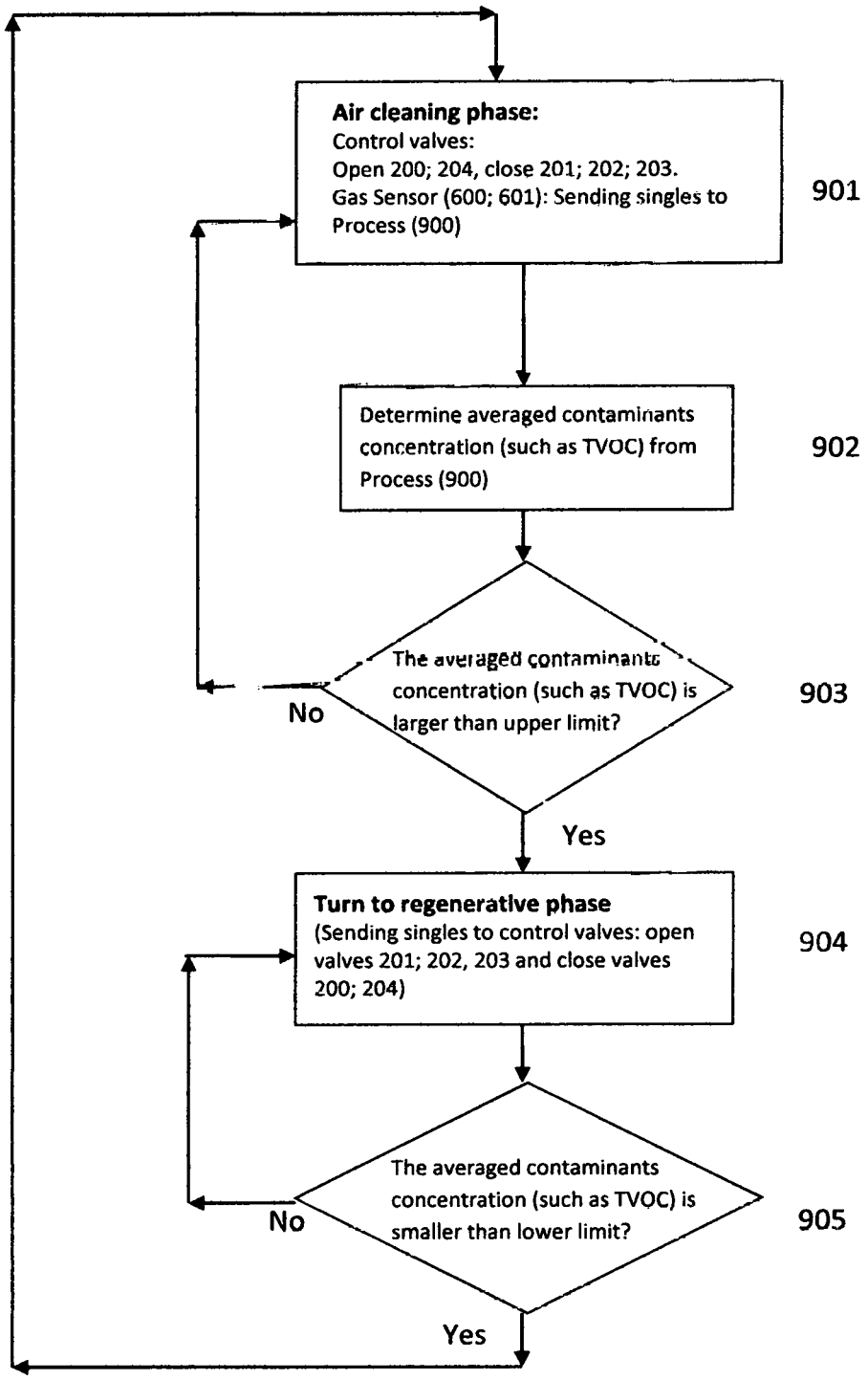
FIG. 10, is a flowchart showing the operation of an embodiment of then present invention of System Two in the air cleaning phase and the regenerative phase.

FIG. 9 and FIG. 10 are illustration of the methods and systems according to the preferred embodiment. The FIG. 9 shows a diagram of the sensors and control valves system used in the embodiment of the present invention of System One. Processor 900 receives sensor signals (such as TVOC concentration) and determines an average concentration from sensors (600 and 601), if the determined concentration is larger than the upper threshold, then the system is switched to the regenerative phase. During the regenerative phase, Processor 900 will continue to receive the signals and determines an averaged concentration, when the averaged concentration is lower than the lower threshold, than the system is turned back to the air cleaning phase. The FIG. 10 also shows the flowchart of System Two in the present invention. It will be understood that each block in such figures and combinations of these blocks, can be implemented by computer program instructions. These computer program instructions may be located on a computer or other programmable data processing apparatus to produce a machine, such that the instructions which execute on the computer or other programmable data processing apparatus create means for implementing the functions a particular manner, such that the instructions stored in computer readable medium or memory which implement the function specified in the blocks.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

REFERENCES

[1] WHO (1989), Indoor Air Quality: organic pollutants, Copenhagen, WHO regional office for Europe (EURO Report and Studies I111)

[2] USEPA (1990) Reducing risk: setting priorities and strategies for environmental protection, Since Advisory Board, US EPA, Washington, D.C.

[3] Spengler, J. D., L. Neas, S. Nakai, D. Dockery, F. Speizer, J. Ware, and M. Raizenne. (1994) Respiratory symptoms and housing characteristics. Indoor Air. 4:72-82, 1994.

[4] Yinping Zhang Jinhan Mo, Yuguo Li, Jan Sundell, Pawel Wargocki, Jensen Zhang, John C. Little, Richard Corsi, Qihong Deng, Michael H. K. Leung, Lei Fang, Wenhao Chen, Jinguang Li, Yuexia Sun (2011 ("Can commonly-used fan-driven air cleaning technologies improve indoor air quality? A literature review" Atmospheric Environment 45(2011), 4329-4343

What is claimed is:

1. A regenerative air purification system comprising:

a gas adsorption filter having a reaction surface for photo-catalytic oxidation (PCO), wherein the gas adsorption filter can capture volatile organic compounds;

a set of gas sensors configured to sense at least one kind of the volatile organic compounds on the adsorption filter surface;

a processor configured to receive input data from the set of sensors, and to compare with predetermined upper threshold or lower threshold; wherein, when the input data exceeds a predetermined upper threshold or lower threshold indicating that a specified concentration of said at least one kind of the compounds is present on the adsorption filter, an alert signal is generated on the processor;

a heater that can be turned on/off by the alert signal, and can heat up the gas adsorption filter to make the captured compounds to be easily desorbed from the gas adsorption filter; and UV lamps that can be turned on/off by the alert signal, and can convert the desorbed compounds near the reaction surface into $H_2O$ and $CO_2$.

2. The regenerative air purification system of claim 1, further comprising auto valves, wherein the processor is configured to send signals to the auto valves to change the system between a cleaning air phase and a regenerative phase;

wherein, when the input data exceeds a predetermined upper threshold, a generated alert signal from the processor will be sent to the auto valves to change the cleaning air phase to the regenerative phase; and wherein, when the input data exceeds a predetermined lower threshold, a generated alert signal from processor will be sent to the auto valves to change the regenerative phase to the cleaning air phase.

3. The regenerative air purification system of claim 1, which is installed in a HVAC air ducting system.

4. The regenerative air purification system of claim 3, further comprising a pre-filter of particles and HEPA-filter of particles or a high efficiency filter with nano-material fibers (HENF) that are positioned upstream of the gas adsorption filter.

5. The regenerative air purification system of claim 3, wherein the gas adsorption filter is configured as a cylinder type of duct; and wherein air penetrates from the outside of the cylinder into the inside of the cylinder during the air cleaning phase.

6. The regenerative air purification system of claim 2, wherein the auto valves are controlled by signal from the processor.

7. The regenerative air purification technology of claim 5, wherein $TiO_2$ or $TiO_2$ mixed with active carbon material is coated on the outer surface of the cylinder as the reaction surface for PCO.

8. The regenerative air purification system of claim 7, wherein the heater is in the central location inside the cylinder.

* * * * *